May 13, 1958  P. LÉGLISE  2,834,448
BLANK TYPING OF TERMINAL SEGMENTS
Filed July 21, 1952  5 Sheets-Sheet 1
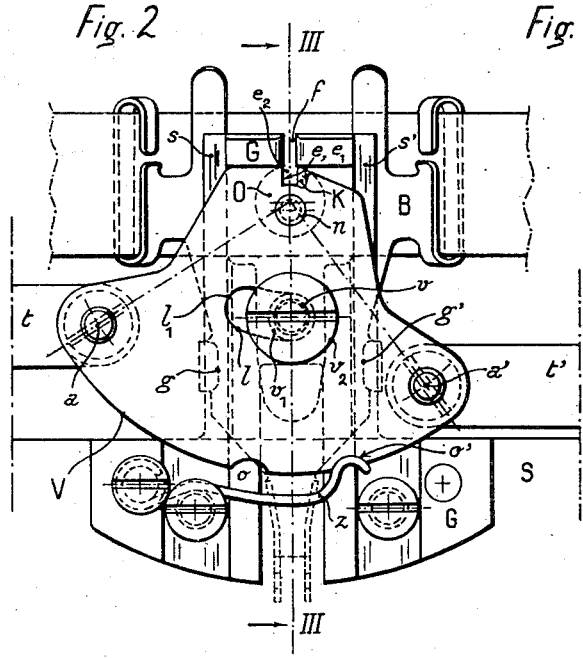
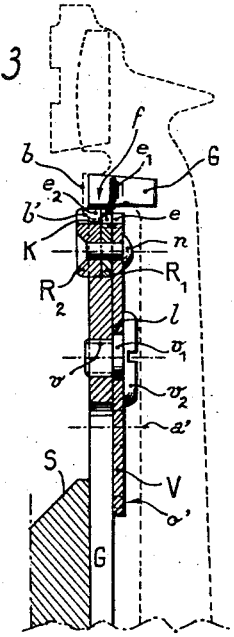
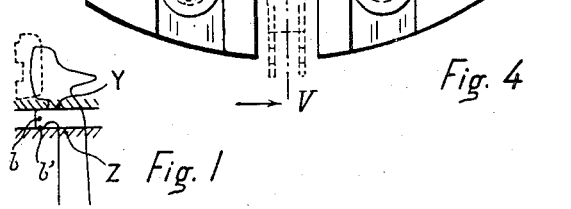
INVENTOR
Pierre Léglise
BY
ATTORNEY

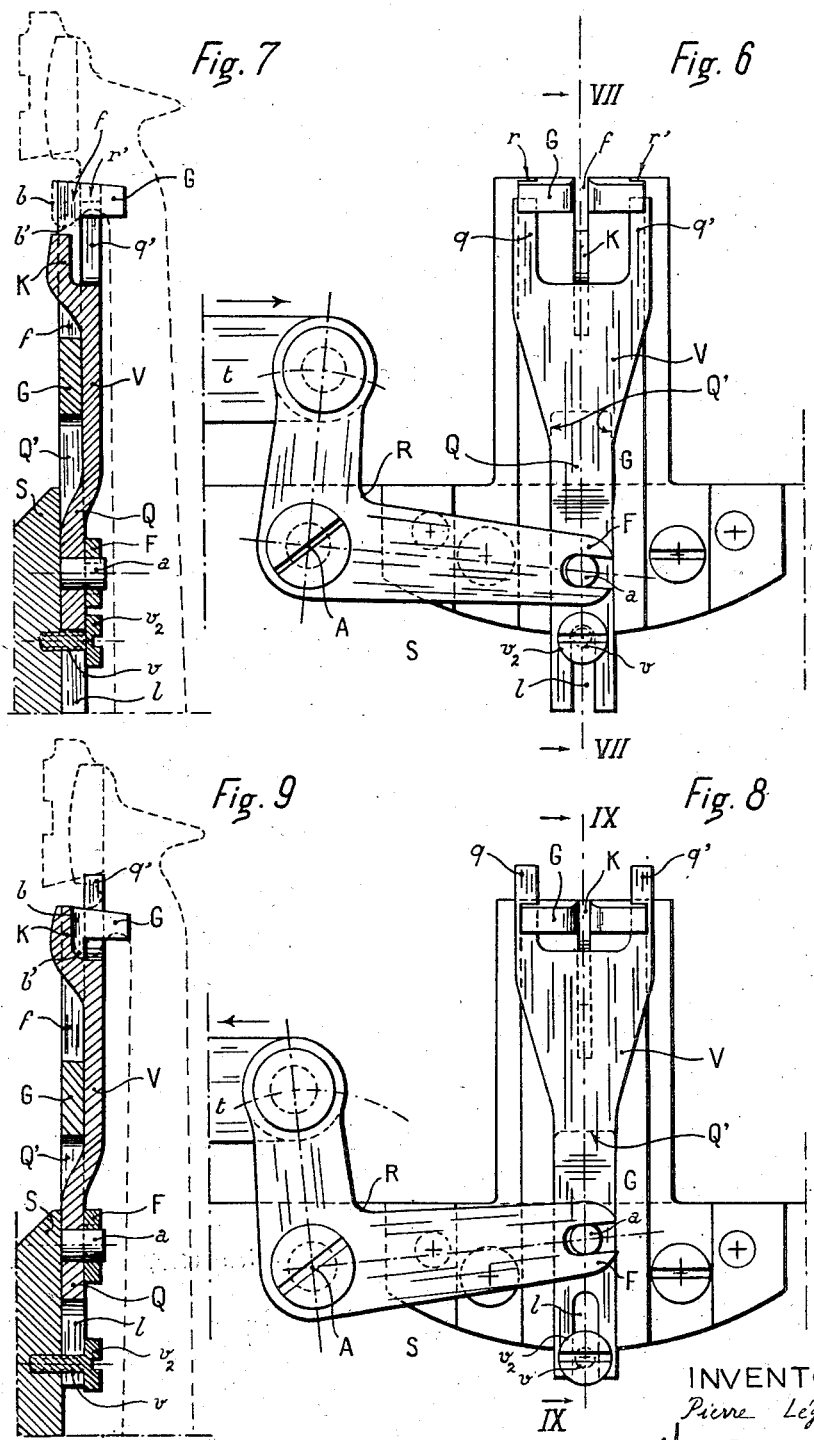

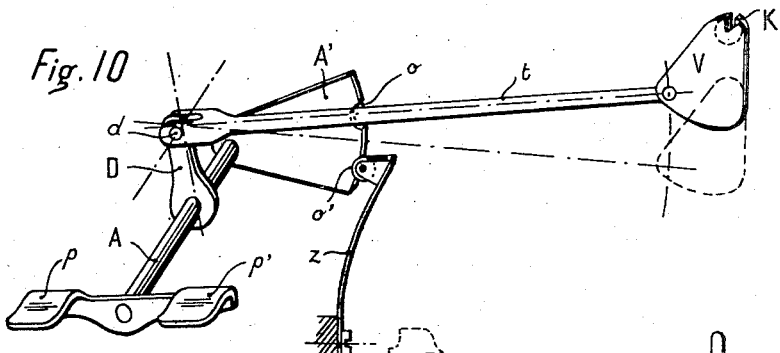
Fig. 10
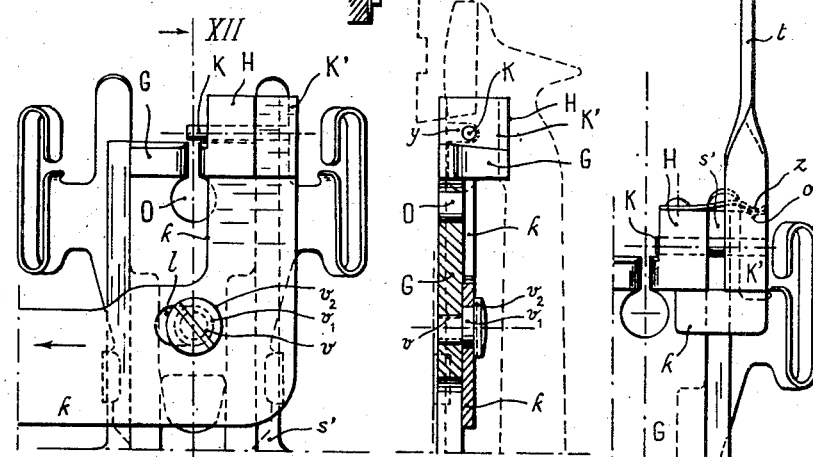
Fig. 11
Fig. 12
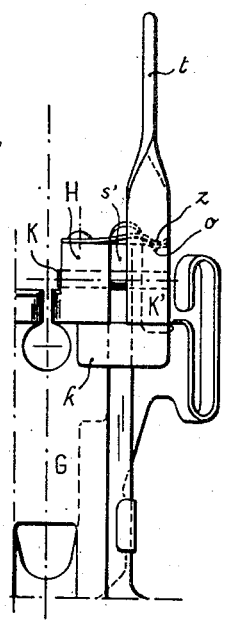
Fig. 15
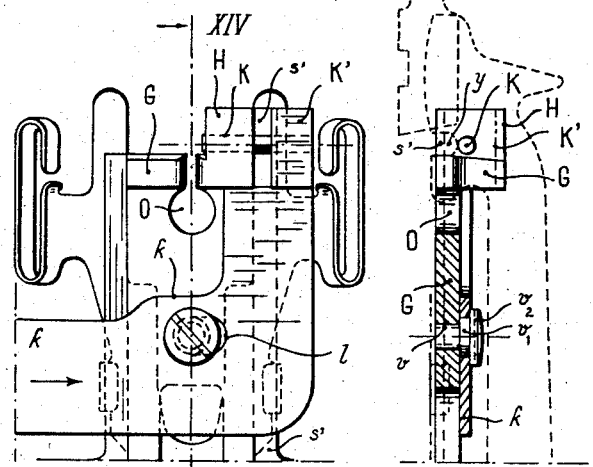
Fig. 13
Fig. 14
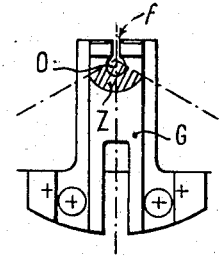
Fig. 16
INVENTOR
Pierre Léglise
BY
ATTORNEY

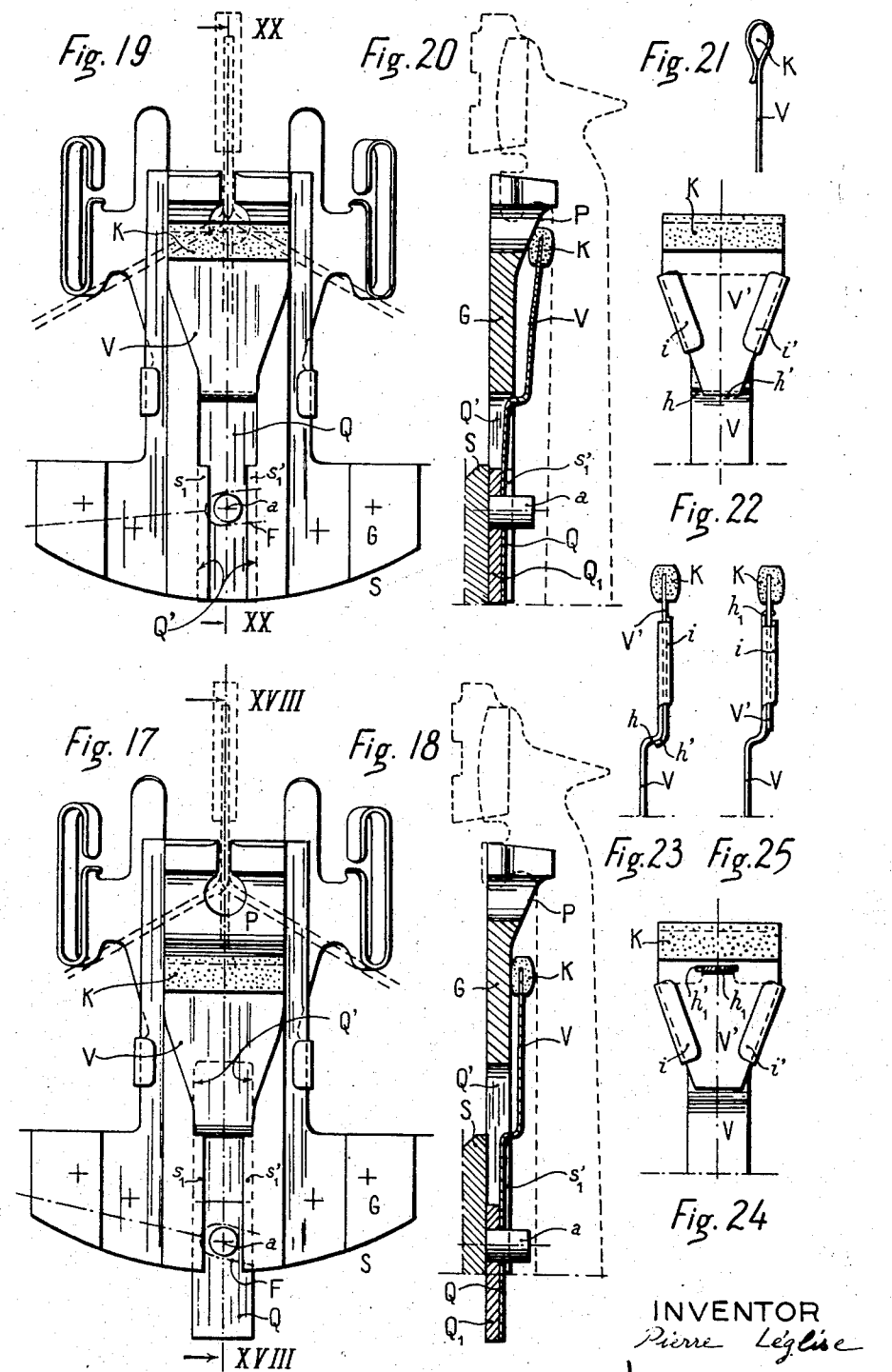

May 13, 1958 P. LÉGLISE 2,834,448
BLANK TYPING OF TERMINAL SEGMENTS
Filed July 21, 1952 5 Sheets-Sheet 5
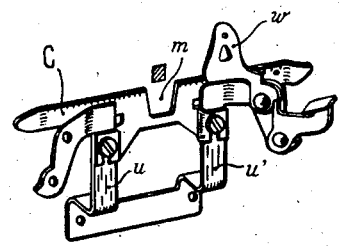
Fig. 26
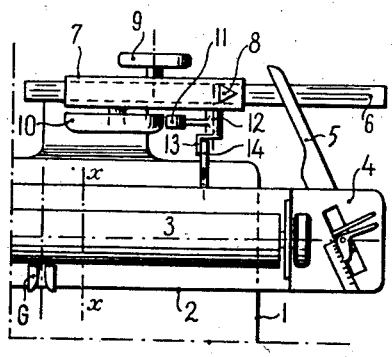
Fig. 30
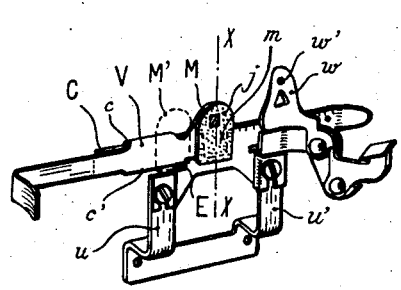
Fig. 27
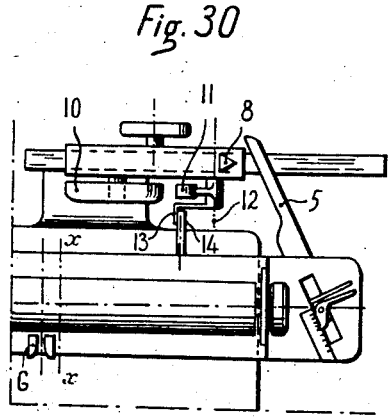
Fig. 31
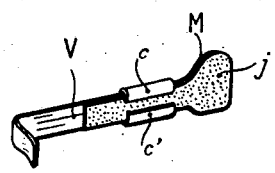
Fig. 28
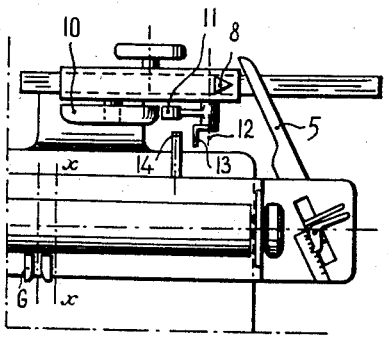
Fig. 32
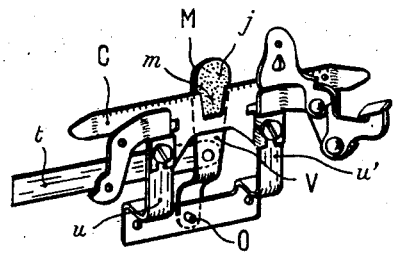
Fig. 29
INVENTOR
Pierre Léglise
BY 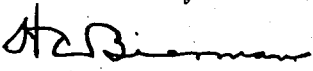
ATTORNEY

United States Patent Office 2,834,448
Patented May 13, 1958

2,834,448

BLANK TYPING OF TERMINAL SEGMENTS

Pierre Léglise, Paris, France

Application July 21, 1952, Serial No. 300,072

18 Claims. (Cl. 197—84)

The present invention is directed to a process and devices to accelerate the blank typing of terminal segments for first attempt justifications performed on end-of-line justifying typewriters.

In the so-called "end-of-line" process of justification as described in the application Serial No. 215,748, filed March 15, 1951, under the title "Process and Apparatus for Justifying Typewritten Material," now Patent No. 2,-696,286, the justification is effected by the regular contraction or dilation of the typing in the final parts of the lines only, called "terminal segments." The justifying mechanisms give the various terminal segments a common length, that of the normal terminal segment, a construction feature of the typewriter.

Whereas the end-of-line justifying typewriters described in the above mentioned application comprise but one normal terminal segment, those that are the subject of the application, Serial No. 297,939 for patent, filed July 9, 1952, under the title "End-of-Line Justifying Typewriter," now Patent No. 2,705,554, comprise several of these segments.

The present invention applies to all these typewriters, for, whatever the number of normal terminal segments embodied in any of them, a given work is generally executed by employing only one of these segments. If the normal terminal segment used for the work in question comprises, for instance, $n$ characters and the justification play covers from $-a$ to $+a$ characters, the various terminal segments, the lengths of which will possibly vary from $n-a$ to $n+a$ characters, will all present after the justification the common length of $n$ normal characters. And, if the normal terminal segment used for another work comprises, for example, $n'$ characters, the various terminal segments, which may comprise from $n'-a$ to $n'+a$ characters, will all present after the justification the common length of $n'$ normal characters.

To achieve the justification without a preliminary typing, it is necessary to count the number of characters of the terminal segments (the term character equally applying here to the spaces between the words). To this effect, the first of the aforesaid applications anticipates the typing of the terminal segments on the space bar, an operation to which the term "fictitious typing" or "blank typing" is given. The operative process is as follows:

The carriage of all ordinary typewriters is fitted with a rule indicating the number of characters. In such typewriters transformed into end-of-line justifying typewriters, a pointer is mounted on the frame to facilitate the reading of the graduations of the rule. The reverse arrangement, graduated rule attached to the frame and reading pointer integral with the carriage, may be found as well. To proceed on a fixed basis, it will be assumed that the first arrangement is adopted.

First of all, the element actuating the justifier has been set on the frame with a view to starting the justifications at a given vertical of the page (the beginning of the lines being typed in a normal way), and the right-hand margin stop set for stopping the carriage when this vertical comes into line with the type guide. At the time of stopping, the pointer shows a certain graduation of the rule, a graduation invariable for a given work and constituting the beginning of all the terminal segments. Take, for example, the graduation as being 50. If the normal terminal segment used for the work under consideration comprises, for instance, 28 characters ($n=28$) and the justification play is $\pm 4$ characters ($a=4$), the terminal segments may comprise from 24 to 32 characters.

For ascertaining the number of characters which the terminal segment of the line begun may contain, the typist frees the carriage by pressing the margin release key, and continues the typing of the text on the space bar; in fact, she taps this bar for every following character or sign of the text, as well as for every space between the words. During this operation, the carriage is displaced character by character without any letter being printed (hence the expression "blank typing"), and the consecutive graduations 51, 52, 53, etc. of the rule move past the pointer. When the graduation 78 (50+28) approaches the pointer, the typist considers how to divide the word actually in the process of being typed. A hyphen being added as the case may be, she observes, for instance, that the graduation indicated by the pointer is 76. The terminal segment thus lacks 78—76=2 characters (the typewriter has in short been used as an adding machine during this blank typing and it has counted 26 characters).

The bringing the carriage back to the place where the impression had ceased, the typist sets the justifier to −2 and types, on the keys this time, the end of the line which thus emerges justified.

The blank typing of the terminal segments on the space bar is not executed at the same speed as a normal typing on the keyboard, for the following reasons:

It is performed with but one finger;

The resolution of words into characters, in other words their spelling, requires a certain degree of attention, while their typing on the keyboard is mechanical with the trained typists, the movements of the fingers on the keys being instinctive; and Finally, the continuous switching from the normal typing of the beginnings of the lines on the whole of the keyboard, to the spelling out of the terminal segments on the space bar, periodically breaks off the rhythm of the work.

The present invention has first of all as an object the process according to which the blank typing of the terminal segments is no longer performed on the space bar by way of spelling, but in a normal way on the whole of the keyboard, with the same speed, therefore, as a normal typing, hence a notable speeding up of the reckoning stage in the justifications at the first attempt.

It has further as an object devices for putting this process into practice, devices by the means of which the impressions on the paper, which normally follow the actions on the keys, are prevented during the blank typings, while the carriage and the rack retain their mobility and move effectively at each of these actions. The devices in question are termed "no impression devices."

It concerns finally the use of a bell for announcing the commencement of the blank typings, the warning thus given replacing the mechanical locking of the carriage by the right hand margin stop, used for the same end in the first of the aforementioned patents.

Two different ways are available to those skilled in the art to prevent the impressions while allowing the releases to be made by the escapement. The one, purely mechanical, consists of limiting the course of whatever group of members of the linking system (type bar actuating gears)—type bar links, sub-levers, key lever links, etc.— assuming a given role in the driving of the type bars (these latter included) to that point of this course where the escapement is motivated while the impression has not yet taken place. The limitations thus introduced must naturally result in the blocking of the type bars when they do not act directly on these latter. This first way will be called that of "preventing impression by mechanical blocking." The other way consists of applying the impressions to a shield or mask inserted between the paper and the ribbon at the proper time. The shield in question must be mounted on the frame in the typewriters with shifting segment, and mounted on the elevator of the platen in the typewriters with fixed segment. This second way will be called that of "intercepting impression by shield or mask."

To put the problem in a clearer light in the case where the preventing of the impressions is obtained by limiting the course of certain members, that is to say, by mechanical blocking, it is advisable to consider the conditions in which the escapement action and the impression take place. From a purely cinematical point of view, the angular position of the type bars for which the escapement action occurs is quite determined. For a slow rotation of the bars, it precedes the printing position by 2 or 3 degrees. For swift rotations, on the contrary, taking into account the inertia of the linking members, the escapement would be generally obtained even if the type bars were stopped a little before the 2 or 3 degrees in question. In fact, in typing at 15 characters per second, for instance (and groups of characters do exist for which the temporary typing speed may be higher), the forward stroke of the type bars hardly requires more than a 40th of a second. The heels of the type bars then striking the universal bar sharply, impart such an acceleration to it that the release would actually result, in any case, from the impetus of the universal bar and its articulated bearings even if the push exercised by the heels were prematurely suppressed. The deformations and plays are moreover responsible for variable lags in the actuation of the universal bar. For the regularity of the running, it is therefore better to design the devices for preventing impression by mechanical blocking on the reduced basis of the above few 2 or 3 degrees corresponding to the cinematic release of the escapement wheel, that is to say, in reference to light typings, rather than on a larger basis which would correspond to dynamical releases, that is to say in reference to energetic typings.

This being noted, of all the members upon which it is possible to proceed, it is the type bars which effect the wider rotations, so that a limiting device applying to the very type bars will be, as a rule, more accurate than any similar device proceeding on a determined group of members of the linking system proper, and obviously all the more precise since it will concern a part of the said bars nearer the end bearing the characters, end henceforth called "head of the type bars." The reactions of the type bars on their pivots or fulcrums at the time of the blocking will be moreover so much weaker as this latter will act farther from the pivot. Besides, the linking system proper occupies a large space whilst the heads of the type bars come into the same zone of the typewriter; the zone of the impressions. A course-limiting device which would concern the whole of the members of the linking system playing a given role in the transmission, would then be generally more cumbersome and complex than a device acting on the heads of the type bars or in their neighborhood.

For these reasons, it is preferable to install the no impression devices based on mechanical blocking in the vicinity of the zone of impression, in practice, on the guide. The general conditions of realization are as follows:

(a) The device must not interfere with the vertical movements of the ribbon carrier;

(b) It must be controlled easily, and its control must not interfere with the vertical shiftings of the segment, in the typewriters with movable segment; and (c) It must include a double locking system; locking in working position, that is to say in the position where the impression is prevented, and locking in the position of free impression.

The invention will be fully understood from the description, which follows, of specific examples, naturally not limiting the possible means of carrying it into practice, in reference to the accompanying drawings in which:

Fig. 1 shows the portions of a type bar on which a blocking device can act;

Figs. 2 to 5 represent a no impression device based on mechanical blocking of the type bars by a turning stop, for a typewriter of the trademark Hermes "Ambassador." Figs. 2 and 3 correspond to the position of free impression, and Figs. 4 and 5 to that of the blocked impression. In the elevation views Figs. 2 and 4, the ribbon carrier is represented, but not the type bar which would impair the readability. On the other hand, in Fig. 3, which is a section along line III—III of Fig. 2, as well as in Fig. 5, which is a section along line V—V of Fig. 4, the ribbon carrier is not represented, but the type bar is shown by dotted lines;

Figs. 6 to 9 represent a no impression device based on blocking of the type bars by a limiter or stop sliding vertically, for the same typewriter Hermes "Ambassador," the ribbon carrier being omitted for the sake of clarity;

Fig. 6 is an elevation view in the position of free impression;

Fig. 7 is a section along line VII—VII of Fig. 6 in which the position occupied by the type bar at the time of impression is shown by dotted lines;

Fig. 8 is an elevational view in the position of blocked impression;

Fig. 9 is a section along line IX—IX of Fig. 8, with the type bar represented by a dotted line in its blocked position;

Fig. 10 is a modification of the control of rotation of the limiter of Figs. 2–5;

Fig. 11 to 14 represent a no impression device based on the blocking of the type bars by a limiter sliding horizontally, still as regards the typewriter Hermes "Ambassador." Figs. 11 and 12 correspond to the position of blocked impression, and Figs. 13 and 14 to the position of free impression. In the elevation views Figs. 11 and 13, the ribbon carrier is represented, but not the type bar, which would impair the readability. On the other hand, in Fig. 12, which is a section along line XII—XII of Fig. 11, as well as in Fig. 14, representing a section along line XIV—XIV of Fig. 13, the ribbon carrier is not represented, but the type bar is shown by a dotted line: blocked in Fig. 12, and in its position of impression in Fig. 14;

Fig. 15 is a modification of the above device;

Fig. 16 shows the area of a sector utilizable for the blocking of the type bars;

Figs. 17 to 20 represent a no impression device based on blocking of the type bars by a limiter with a wide surface sliding vertically, still in respect to the typewriter Hermes "Ambassador." Figs. 17 and 18 correspond to the position of free impression, and Figs. 19 and 20 to that of blocked impression. Figs. 17 and 19 are elevational views, and Figs. 18 and 20 sections of the previous respectively along lines XVIII—XVIII and XX—XX;

Fig. 21 represents in section a modification of the limiter of Figs. 17 to 20;

Figs. 22 and 23 represent, respectively in elevation and in a side view, a removable limiter for a device following Figs. 17 to 20;

Figs. 24 and 25 represent another type of removable limiter;

Fig. 26 represents in perspective certain members specific to the typewriter with the trademark Remington "Seventeen";

Fig. 27 shows the mounting on the above members of a no impression device based on a sliding mask;

Fig. 28 is a variation of the sliding mask of Fig. 27;

Fig. 29 represents the mounting on the members of Fig. 26 of a no impression device using a pivoting mask; and Figs. 30 to 32 show diagrammatically the installation and the functioning of a bell announcing the beginning of the blank typings.

The realization of the invention comprises as many variations as there exist different makes and types of machines, the design of the guide, that of the sliding arrangement of the ribbon-carrier on the guide, the form of the type bars, as well as the spaces available for the control of the devices varying from one typewriter to another. That is why, in order to make the nature of the invention well understood by specific examples, different forms of these devices will be described for two definite typewriters of well known makes: on the one hand the Hermes "Ambassador" Swiss typewriter, made also in France by the Etablissements Japy Freres under the name "S17," on the other hand the Remington 17. The transposing of the devices to other typewriters, with the modifications which the differences in structure of these typewriters might entail with regards to the one or the other of the above types, will then be no more than a question of adaptation. The examples given for the Hermes "Ambassador" will concern the no impression devices based on a mechanical blocking of the type bars, and those given for the Remington 17, the no impression devices using the interposition of a mask.

From the point of view of blocking, three parts can be distinguished in the head of a type bar (Fig. 1): the centering wedge $b$, the region $Y$ situated between $b$ and the type block, and the region $Z$ situated under $b$. A blocking device for any one of these parts will fill the desired conditions of compactness, working precision, and weakness of the reactions of the bars on their fulcrum wire at the time of the blocking impacts. However, whereas the centering wedge and the region $Y$ of all the type bars are in the same vertical plane at the time of the impressions, the regions $Z$ diverge from this plane.

The blocking devices of the type bars acting on the centering wedges will first of all be described.

In the "Ambassador," the guide $G$ (Figs. 2 and 3) mounted on the segment $S$, comprises a hole $O$ which is increased slightly to facilitate the machining of the limiter $K$ which will be described later. Above $O$ is the type guide $f$. When the centering wedge $b$ (Fig. 3) of a type bar engages itself in the type guide $f$ for the impression, it fills it entirely, within the tolerances allowed, and its rounded nose $b'$ enters hole $O$. (It is on this nose that the blocking is effected in the first of the solutions below. A further solution will show the manner of effecting the blocking on the centering wedge itself.)

The ribbon carrier $B$ can slide along the guide $G$ by means of two claws $g$ and $g'$ encompassing the thinned edges $s$ and $s'$ of $G$. Figs. 2 and 4 represent the ribbon carrier at its lowest point on the guide $G$, i. e. when the segment is in its upper position for the typing of the small letters. When the segment is lowered for the typing of the capital letters, $G$ descends in relation to $B$, so that, if the no impression device does not interfere with the ribbon carrier in the first of these positions, it does not interfere, with still more reason, in the second.

The device consists essentially of a limiter $K$, integral with a shutter $V$ moving in contact with the guide $G$, and the spindle of which turns in the hole $O$. The shutter has in its central part, a slot $l$ in the form of an arc of a circle around $O$, in which the guiding boss $v_1$ of a screw $v$, screwed in $G$, engages itself. The boss $v_1$ presents a diameter equal to the width of the slot $l$ and its sides form stops for the circular ends $l_1$ and $l_2$ of slot $l$, for the two positions that the shutter $V$ can take; blocked impression or free impression. The head $v_2$ of the screw $v$ holds the shutter $V$ flat against the front face of the guide $G$, without, however, impairing its rotations.

At its upper part is a recess $e$, partly in the form of a sector, with a radial depth less than the radius of the hole $O$, and with an angle at the center of about twenty degrees so as to permit the passage of the noses $b'$ whatever the angular position of the shutter. At its lower part, concentric with $O$, are two notches $o$ and $o'$ cooperating with a spring $z$ to lock the shutter in the position of blocked impression or in that of free impression. Laterally are two holes $a$ and $a'$, for the articulation of the control rods $t$ and $t'$, the ends of which project from the body of the typewriter on each side, the moving of the rod $t$ until it locks the shutter $V$ in the position of blocked impression causing the passing of the other rod $t'$, and vice versa.

Behind shutter $V$ and engaged in the hole $O$, is a first washer $R_1$ presenting a recess $e_1$ identical with the recess $e$ of the shutter $V$ and prolonging this recess in the direction of the axis of the hole $O$. The washer $R_1$ forms the front part of the spindle of the shutter $V$.

Behind $R_1$ is a second washer $R_2$, made of hard steel, comprising a notch $e_2$ with the same radial depth as the recesses $e$, $e_1$, and of a slightly greater width than that of the type guide $f$. The washer $R_2$, which forms the after part of the shutter spindle, is set with respect to the washer $R_1$ in such a way that the left wall of its notch $e_2$ prolongs the left wall of the recess $e_1$ (which already prolonged that of the recess $e$), in the direction of the axis of the hole $O$. After the joining, the left walls of the notch and recesses in $R_2$, $R_1$ and $V$ are thus in the same plane. Then the limiter $K$ is constituted by the part of the washer $R_2$, situated on the right of the notch $e_2$, which the coupled recesses $e$—$e_1$ leave uncovered; in other words, $K$ is the small portion of metal comprised between the right wall of $e_2$ and the common right wall of $e_1$—$e$. The washers $R_1$ and $R_2$, at first assembled on the shutter $V$ by means of a rivet $n$, are further brazed together and to the shutter.

When the radial notch $e_2$ of $R_2$ comes vertically under the type guide $f$ (Figs. 2 and 3), the rounded noses $b'$ of the centering wedges $b$ pass freely in the hole $O$ and the impressions can take place. When the shutter $V$ has turned about twenty degrees (Figs. 4 and 5), the portion of the hole $O$ which previously remained open to these noses is closed by the limiter $K$ and the impressions cannot take place.

It is understood that the position in the hole $O$ of the blocking plane constituted by $K$ depends on the thickness of the washer $R_1$. This thickness is therefore chosen such that the escapement action is guaranteed under all circumstances (faint typing, irregular forms of the rounded noses $b'$, etc.), without the impressions however being allowed. As for the washer $R_2$, its thickness does not matter, provided that the ribbon does not risk catching the rear part of $R_2$ when the ribbon carrier shifts vertically, and that the limiter $K$ offers a sufficient resistance to wear.

According to a modified form of execution $R_1$ and $R_2$ form a single washer in which the radial notch $e_2$ and the recess $e_1$ are cut.

According to another modification represented diagrammatically in Fig. 10, the rotation of the shutter $V$ is controlled by a single rod $t$ and the locking of the said shutter in the one or other of its positions is performed on its outside. Then the rod $t$ is actuated by a two position control of any design; it is, for example, articulated at $d$ on an arm $D$ integral, by the intermediary of a shaft $A$, with two push-buttons $p$ and $p'$ incorporated in the keyboard. $A$, which is mounted on the frame, carries a locking sector $A'$, with two notches $o$ and $o'$ cooperating with a spring $z$, also fixed on the frame. Then length of the rod $t$ and the position of its articulation $d$ are such that the lowering of the shutter V (position shown in dotted lines), consecutive with the lowering of the segment at the time of the motion from the lower case to the upper case, does not modify the angular setting of the limiter K.

The blocking of the type bars by their centering wedges can equally rest on the sliding of a shutter, instead of resulting from the rotation of such a member as above. Figs. 6 to 9 show a mounting of this kind on the same guide of the "Ambassador" as in Figs. 2 to 5, the ribbon carrier not however being represented for the sake of simplification. In this embodiment the blocking impacts concern the centering wedges in all their length or in an important fraction of this latter, and no longer only their rounded noses $b'$, a favorable arrangement for the life of the mechanisms.

The shutter V bearing the limiter K, this time in the shape of a vertical tongue, comprises two horns $q$ and $q'$ and a tail Q. It is retained against the guide G, on the one hand, by means of the engagement of the horns $q$ and $q'$ in the grooves $r$ and $r'$ milled at the upper part of G, and on the other hand, by the head $v_2$ of the screw $v$ in the segment S ($v$ enters in a slot $l$ of the tail Q). The engagement of Q in the hollow Q' of the guide, that of the limiter K in the type guide $f$ extended downwards to the necessary length (the hole O being eliminated), as well as, eventually, the sliding of the horns $q$ and $q'$ against the grooves $r$ and $r'$, assure the lateral maintenance of the shutter on the guide.

The vertical movements of the shutter may be obtained, for example, by a bell-crank R articulated at A on the segment S. The fork-arm F of the bell-crank embraces pin $a$ of the shutter. The control rod $t$, projecting from the left hand side of the machine, can be pushed or pulled, and it is maintained in one or the other of these positions by a two-position locking device, not represented.

When the rod $t$ is pushed towards the center of the typewriter (Figs. 6 and 7), the limiter K lowers itself and the centering wedges $b$ of the type bars pass freely in the type guide $f$. When it is pulled (Figs. 8 and 9), the limiter K rises and the centering wedges $b$ are blocked.

The arm with the fork F may also be controlled in rotation by a device similar to that of Fig. 10.

Following a modification, the horns $q$ and $q'$ are eliminated and the shutter V is maintained against the guide G by a screw similar to the central screw $v$ of Figs. 2 to 5 passing in a slot of the shutter, the slot then being vertical instead of circular, as in $l$ in the figures in question.

As an example of no impression devices preventing impression by mechanical blocking of the type bars in their region Y (Fig. 1), a type of horizontal limiter will now be described, still as regards the Hermes "Ambassador."

The type bars present in this region a recess $y$ (Figs. 11 to 14), with a rounded bottom utilizable for the blocking. The limiter K consists of a cylindrical pin sliding in a projection H at the upper part of the guide G: on the right, for preference, in order not to mask the typing taking place (this is the only modification of the guide; the hole O has its original diameter). K is carried by a parallelepiped block K', integral with a plate $k$ having a horizontal slot $l$. The plate is maintained in contact with the guide G by the head $v_2$ of the screw $v$, the boss $v_1$ of which guides slot $l$. It is easy to link the plate $k$ to a rod $t$ (not represented) projecting from the casing of the typewriter.

The direct control of the limiter K is most simple (Fig. 15). It suffices to provide the block K' with a push handle $t$ more or less vertical, which the typist may shift towards the left or right. The plate $k$ is of a size just sufficient to maintain K', which the contact of the rear wall of K' with the thinned edge $s'$ of the guide G already assures.

A slight friction in the sliding is enough to immobilize the limiter K in the desired position. On the one hand, indeed, the shocks which this member receives do not tend to displace it since their direction is perpendicular to its axis, and besides, its mounting is unaffected by gravity, which was neither the case of the rotating shutter of Figs. 2 to 5, nor of the vertically sliding shutter of Figs. 6 to 9. If Fig. 15 incorporates a locking of K in a position of free impression (by engagement in the notch $o$ of the block K' of a leaf-spring $z$ fixed to the projection H), it is chiefly to prevent K' from striking against the ribbon carrier when the push handle $t$ is manipulated sharply. From this point of view, the above system may be replaced by a plate fixed on H, and the flanged end of which forms a stop for the right side of K'.

In the no impression devices based on mechanical blocking of type bars, various realizations of such devices concerning the regions Z (Fig. 1) of the bars will be finally described (still for the Hermes "Ambassador" taken as example). In an elevational view (Fig. 16), these regions, projected on the guide, cover a sector such as Z. The limiter can then take the form of a small horizontal bar as long as the guide is wide; it is this bar which the type bars strike under variable inclinations, an advantageous arrangement, the blocking impacts thus contacting much greater portions of the type bars and limiter than in the preceding cases.

The small limiter-bar K consists, for example (Figs. 17 and 18), of a vulcanized rubber pad fixed by mortise and sticking to the upper edge of a small plate V, made of spring-steel, comprising a tail Q. According to another version, the plate V is simply folded back on itself, as Fig. 21 indicates, to form in K the thickness necessary to the blocking, with the filling of the cavity thus constituted if necessary.

The tail Q, reinforced by a plate $Q_1$, slides vertically in the hollow Q' of the guide G, between the segment S and the two flanges $s_1$ and $s'_1$ provided on G at the time of milling Q'. The vertical movements of the limiter are provoked by a bell-crank, the fork-arm F of which drives a pin $a$ of the tail Q, the said bell-crank being controlled either by a rod $t$ emerging laterally from the typewriter, as in Figs. 6 to 9, or else by links ending on the keyboard as in Fig. 10. This being said, the blocking of the type bars results (Figs. 19 and 20) from the slight forward movement of the limiter K consequent to its being raised along the inclined plane P established on the guide.

The limiter K being considered as consumable material in the same way as a ribbon, various arrangements are used to facilitate its replacement. Essentially (Figs. 22 to 25), the small plate V is fitted with a removable limiter-holder V' fixed on V by engagement in the channels $i$, $i'$, formed by the edges of V, and is held in any manner whatsoever: e. g., (Figs. 22 and 23), through the friction of the bend $h$ of V on the base $h'$ of V' rounded for this purpose, or (Figs. 24 and 25) by the penetration of a flanged edge $h_1$ of V in a slot $h'_1$ of V'.

The mountings which have just been described in respect to a specific case do not intend, of course, to limit the modifications likely to be made, as much as for the shape of guide considered as for other shapes, i. e. for typewriters other than the Hermes "Ambassador" taken as an example.

The impressions can also be prevented, as has been said, by the interposition of a mask between the ribbon and the paper. Although the rotation of the type bars is then limited at the end of the course by the mask in question, it is no longer the principle of their mechanical blocking which is involved, but that of the application of the impression on a screen. As an example of such a mode of realization of the invention, the adaptation of the process to another well known typewriter: the Remington "Seventeen," will now be described.

In this typewriter, a piece with two brackets $u$, $u'$ (Fig. 26), is mounted on the frame, behind the guide, These brackets support on the one hand, a small graduated rule C, with a length of about forty characters, on the other hand, foldable wings such as w. As these latter play no role in the invention, only one of them is represented on the right of the figure. The small rule C is hollowed out at m to allow the penetration of the types, which force back the ribbon there at the time of the impressions; the printing area corresponds approximately, on the platen, to the small shaded rectangle.

This particular structure being noted, the putting into practice of the invention by eclipsable masks is most simple. The displacements of these members can be performed by translation or rotation.

Fig. 27 shows the mounting of a mask sliding on the rule C. First, one of the foldable wings, the left one for example, is removed. These wings are meant only as guides for tracing points, and the function formerly assumed by the removed wing may be fulfilled by the remaining one, provided it has drilled in it a supplementary hole, such as w'. Further, the bracket u is reduced to the height strictly necessary to support the small rule C. Finally, the left end of C is straightened.

The mask M is carried by a slider V, made of spring-steel, moving somewhat stiffly on the rule C by means of its claws c, c', facing backwards. A layer j of an elastic material: rubber, plastic or resisting tissue, is stuck on M to avoid the deterioration of the ribbon as well as the types by the blank typings. The left extremity of the slider forms a pusher.

When the slider V is pushed as far as contact of its claw c' with the recess E forming a stop under the rule, the mask comes in front of the hollow m. Under the shock of the type blocks, it twists slightly around the upper edge of the rule and is depressed along the line xx. These two deformations concur to absorb the shocks in question. When the slider is retracted, the mask M exposes the hollow m (position M' indicated in dotted lines), and the printing can again take place. No locking of the slider is necessary; its friction against the rule suffices to keep it in the position where the typist has placed it.

Although this impression preventing method resembles in some respects that previously described for the mechanical blocking of the type bars, these latter being effectively stopped by the mask, it applies chiefly indeed the principle of the reception of the impressions by a surface other than the paper; but, if the mask is mounted behind the small rule C, it is this last principle only which is applied. To obtain the necessary space for mounting, it is enough to draw the small rule C a little nearer the brackets u, u'. The claws c, c', are then turned forward (Fig. 28) and the layer j of resilient material presents a greater surface than in the preceding case in order that its light contact with the small rule suffices to maintain the slider in place. Under the shock of the type, and owing to its resiliency, the mask is flattened, in most cases, against the paper.

Fig. 29 shows the mounting of a mask pivoting behind the small rule C, this mounting thus applying again the principle of the reception of the impression by a mask, and this principle alone.

The mask M forms the extremity of an arm V, of spring-steel, articulated somewhat stiffly at O on the piece with the brackets u, u'. The rotation of the arm is controlled by a rod t projecting from the typewriter and eventually blockable in two positions. Under the shock of the type, the arm V bends and the mask applies its metallic face against the paper whilst its layer j of elastic material receives the impression. The mask M may also be mounted in front of hollow m.

It is evident that the control of the slider or the arm V, both holders of the mask M, can be carried out from the keyboard, as could previously the control of the various limiters K in the blocking devices for type bars.

The sliding or rotating mountings of masks which have just been described for a particular arrangement of certain accessory fittings such as a small graduated rule, brackets, etc. do not intend, of course, to limit the variations of these mountings likely to be made, as much as regards the arrangement considered, as for others, that is to say, typewriters other than the Remington "Seventeen" taken as example.

Whether it concerns the mechanical blocking of type bars or the interposition of a mask, the control of the no impression device can be connected to that of changing the color of the ribbon (bichrome handle). The position of free impression corresponds then to that of the handle for which the throws of the ribbon carrier are at a minimum, and the position of blocked impression to that for which there is no raising of the ribbon carrier. For justifications at the first attempt made on stencils, the control of the no impression device is disconnected from that of the bichrome mechanism, since this latter is then put at rest whilst the no impression device must retain its mobility.

Although described in their particular application to typewriters, the above devices do not concern simply these machines; they apply equally to machines presenting a similar general organization, and in which the temporary suppression of the impressions normally consequent to the typing on the keys may be similarly useful, but for other purposes than the end-of-line justification, for example, accounting machines.

Again in accordance with the invention, the ringing of a bell replaces the blocking of the carriage by the right hand margin stop (line lock), anticipated in the first of the above named applications to announce the beginning of the justifications.

In practice, the bell is arranged to ring two characters (or, according to the construction, from one to three characters) before the justifier enters into contact with its actuating member, this contact marking the beginning of all the terminal segments. If the typist, in her hurry, overruns the signal and encroaches somewhat on the terminal segment, thus printing, for example, the first two characters of this latter before knowning the dilation or contraction that it will have to undergo, it has hardly any importance, the extreme cases of dilation on contraction being met only quite exceptionally. It is even recommended, when the beginning of a terminal segment falls in the middle of a short word, to finish typing this word; the difference between the place which the last letter of such a word then occupies and that which it should have occupied consequent upon the justification, is fully absorbed by the following space.

The elimination of any blocking of the carriage as a means of warning avoids the loss of time involved in operating the margin release key (line lock); it is true that this time is taken up by the operation of the no impression device, but the loss of time would be doubled if the line lock remained in use. Moreover, it is not only once every line that the margin release key would have to be actuated, but occasionally twice. The blank typing terminated, the typist must bring back behind the type guide the beginning of the part of the line which has received only the blank typing. Subsequent to too strong a push, the carriage, going too far, can overrun the right hand margin stop and operate it, whence there is a second blocking at the passage through the beginning point of the justifications, and thus the necessity of a second manipulation of the margin release key. (This drawback occurs as well when the blank typings are performed on the space bar, so that, even for such a mode of execution of these typings, the replacement of the right hand margin stop by a special bell is advantageous.)

There exist, moreover, typewriters in which the right hand margin stop (as well as the left hand margin stop), being carried by the carriage, is limited as regards its shifting range, by a certain partition of the carriage intended to reinforce this element in its middle. As the need for right hand margins larger than half the page is seldom felt in current typing practice, this arrangement does no harm. However, when such typewriters are transformed into end-of-line justifying typewriters, it would be impossible to achieve straight columns in the left half of a page, the beginning of the justifications being then brought forward in a zone that the right hand margin stop cannot reach. The use of a bell to announce this beginning also removes the limitations which these typewriters would suffer in end-of-line justification.

Figs. 30 to 32 show diagrammatically the installation and the functioning of a bell for the beginning of justification, in the case of a typewriter with a justifying lever pivoting on an axle carried by the rack.

1 is the frame of the typewriter; 2, the carriage; 3, the platen; 4, the terminal justifier; 5, the justifying lever; 6, the rail, integral with the frame, on which is set the slider 7 bearing the stop 8 actuating the justifying lever; 9 is the milled knob for locking the slider 7. On the three figures, the position of the stop 8 is such that the justifications begin at the section xx of the platen. Besides, the ensemble constituted by the slider and the bell is represented on a greater scale than the other parts, for the clearness of the diagrams.

The bell, similar to that which is to be found in all typewriters to announce the end of lines—it is then actuated by the right hand margin stop—comprises a bowl 10 and a hammer 11 articulated on the axle 12; the bowl and axle are mounted on the slider 7. A spring, not represented, brings back the hammer 11 to a neutral position. The hammer is integral with a transverse finger 13 which the stud 14 of the carriage will drive. G is the guide of the frame, as previously.

The working of such bells is in itself known, but it appears desirable to describe the carriage displacements corresponding to the various phases of the operation, in end-of-line justification.

When the justifying lever 5 is still, for example, six or seven characters from its actuating stop 8 (Fig. 30), the section xx of the platen being, therefore, the same distance from the type guide G, stud 14, which moves longitudinally with the carriage 2, begins to rotate the finger 13. The hammer 11 is drawn away from the bowl 10 and its return spring is stretched.

When the lever 5 comes to within two characters (or, according to the construction, 1–3 characters) of the stop 8 (Fig. 31), the finger 13, which has been raised while turning around the axle 12, is about to escape from stud 14. At the moment the escapement effectively occurs, the hammer 11 swings, hits the bowl and returns immediately to its neutral position under the action of its return spring (Fig. 32). The section xx of the platen is then two characters from the type guide G.

It is obvious that the bell (ensemble of the parts 10–13) may be mounted on the carriage, and its actuating stud 14 on the slider 7.

The installation of a bell for the beginning of justification, described above as an example, concerns end-of-line justifying typewriters with a justifying lever pivoting on the rack. It must be well understood, however, that it is not limited to these typewriters, but applies, on the contrary, to all the end-of-line typewriters described in the above-named applications. From this general point of view, the justifying lever 5 of Figs. 30 to 32 represents the driven member of the justifier, and the stop 8 represents the member driving the justifier. This last member is always carried by an adjustable slider, corresponding to the slider 7 of Figs. 30 to 32.

I claim:

1. A method of typing justified lines which comprises typing an initial portion of a line, stopping said typing at a predetermined point in the travel of the typewriter carriage, said point being the same for all the lines to be typed in a given piece of work, introducing a no-impression device for the terminal segment of the line and continuing typing to the end of said segment while the carriage moves but without producing impressions on the sheet, then returning to the beginning of the terminal segment, setting the justifier according to the carriage course during the blank typing of said terminal segment, removing the no-impression device and actually typing said terminal segment.

2. A device for the blank typing of line terminal segments comprising a guide having a type guide for type bars, a stop member movably mounted adjacent the guide, said stop member being adapted to prevent type impressions in said segment while typing and movement of the typewriter carriage continue, means for placing said stop member alternately into operative and inoperative positions, means for immobilizing said stop member in each of said positions, and means for indicating to the operator when said stop member should be put into operative position.

3. A device according to claim 2, including a shutter pivoted on said guide for operation in front of the same, said stop member being carried by said shutter, and means for oscillating said shutter to thereby move said stop member into operative or inoperative positions.

4. A device according to claim 2, including a shutter pivoted on said guide, said stop member being in the form of a portion of a sector on said shutter adjacent to said type guide to thereby stop said type bars level with the centering wedge thereof, and means for oscillating said shutter into operative and inoperative positions.

5. A device according to claim 2, including a shutter slidably mounted relatively to said guide, said stop member being in the form of a tongue on said shutter located adjacent to said type guide to stop said type bars level with the centering wedge thereof, and means for upwardly and downwardly shifting said shutter.

6. A device according to claim 2, including a block slidably mounted on said guide, said stop member being in the form of a pin located on said block above the type guide to stop the type bars level with a recess above the centering wedge thereof, and means for laterally shifting said block to move said pin into and out of said recess.

7. A device according to claim 2, including a resilient plate slidably mounted on said guide, said stop member being in the form of a horizontal bar on the upper edge of said plate and caused to move forwardly by an inclined surface on said guide when said plate is being shifted vertically, said bar having a relatively large surface with a length substantially equal to the width of said guide and being struck at a different point by each particular type bar below the centering wedge thereof, and means for upwardly and downwardly shifting said plate into operative and inoperative positions.

8. A device according to claim 2, including a resilient plate slidably mounted on said guide, said stop member being in the form of a horizontal bar composed of a pad of shock-absorbing material fixedly secured at the upper edge of said plate and caused to move forwardly on an inclined surface on said guide when said plate is being shifted vertically, said bar having a relatively large surface with a length substantially equal to the width of said guide and being struck at a different point by each particular type bar below the centering wedge thereof, and means for upwardly and downwardly shifting said plate into operative and inoperative positions.

9. A device according to claim 2, including a resilient plate slidably mounted on said guide, said stop member being in the form of a horizontal bar consisting of a pad of shock-absorbing material removably carried by the plate and caused to move forwardly on an inclined surface on said guide when said plate is being shifted vertically, said bar having a relatively large surface with a length substantially equal to the width of said guide and being struck at a different point by each particular type bar below the centering wedge thereof, and means for upwardly and downwardly shifting said plate into operative and inoperative positions.

10. A device according to claim 2 including a stop member in the form of a mask movably mounted on a part of the typewriter frame located between said guide and the platen, the mask being operative between the ribbon and the paper sheet, and means for putting said mask into operative or inoperative positions.

11. A device according to claim 2, including a stop member in the form of a mask having a face at least partially covered by a layer of shock-absorbing material, said mask being movably mounted on a part of the typewriter frame located between said guide and the platen, and being operative between the ribbon and the paper sheet, and means for putting the mask into operative and inoperative positions.

12. A device according to claim 2, wherein the stop member is actuated by a push-handle located near said guide.

13. A device according to claim 2, wherein said stop member is remotely actuated by a control system including at least a control rod emerging laterally from the typewriter frame.

14. A device according to claim 2, wherein said stop member is remotely actuated by a control system ending in a key incorporated in the typewriter keyboard.

15. A device according to claim 2, wherein said stop member is remotely actuated by a control system ending in a key incorporated in the typewriter keyboard, and said control system is connected by a detachable coupling to the mechanism for changing the color of the typewriter ribbon.

16. A device according to claim 2, wherein said stop member is immobilized in its operative and inoperative positions by the friction of its carrying member against the typewriter parts supporting said carrying member.

17. A device according to claim 2 wherein said stop member is immobilized in operative and inoperative positions by a two-position locking device.

18. A device according to claim 2, wherein the indicating means consists of a bell, the bell having a bowl and hammer mounted on the adjustable slider carrying an actuating member for the justifier, and the member operative to motivate the hammer being mounted on the carriage.

References Cited in the file of this patent

UNITED STATES PATENTS

| | | |
|---|---|---|
| 491,767 | McCarthy | Feb. 14, 1893 |
| 576,247 | Barron | Feb. 2, 1897 |
| 581,574 | Daugherty | Apr. 27, 1897 |
| 2,111,410 | Stickney | Mar. 15, 1938 |
| 2,696,286 | Leglise | Dec. 7, 1954 |

FOREIGN PATENTS

| | | |
|---|---|---|
| 747,006 | Germany | Sept. 4, 1944 |